United States Patent [19]
Dombrowski

[11] 4,033,209
[45] July 5, 1977

[54] SUPPORT ROLLS FOR SUPPORTING WHEELS OF A WHEEL SET DURING REPROFILING

[75] Inventor: Theodor Dombrowski, Erkelenz, Germany

[73] Assignee: Wilhelm Hegenscheidt GmbH, Erkelenz, Germany

[22] Filed: Apr. 19, 1976

[21] Appl. No.: 677,883

[30] Foreign Application Priority Data

Apr. 22, 1975 Germany .......................... 2517755

[52] U.S. Cl. .................................................. 82/8
[51] Int. Cl.² ......................................... B23B 5/28
[58] Field of Search ............................................ 82/8

[56] References Cited

UNITED STATES PATENTS

| 3,203,286 | 8/1965 | Dombrowski | 82/14 R |
| 3,345,890 | 10/1967 | Dombrowski | 82/8 |
| 3,839,932 | 10/1974 | Dombrowski | 82/8 |

FOREIGN PATENTS OR APPLICATIONS

| 1,124,782 | 3/1962 | Germany | 82/8 |

*Primary Examiner*—Harrison L. Hinson
*Attorney, Agent, or Firm*—Michael J. Striker

[57] ABSTRACT

A machine for reprofiling wheels of rail vehicles includes, for each wheel of a wheel set, a pair of support rolls arranged spaced from each other in a plane normal to the axis of the wheel set. The peripheral surface of each support roll has an axially extending carrying zone and an axially extending transfer zone following the carrying zone in a direction toward the center plane of the wheel set and being inclined with respect to a horizontal line through an angle greater than the angle included between the desired profile to be machined into a portion of the wheel opposite the transfer zone and a horizontal line.

11 Claims, 10 Drawing Figures

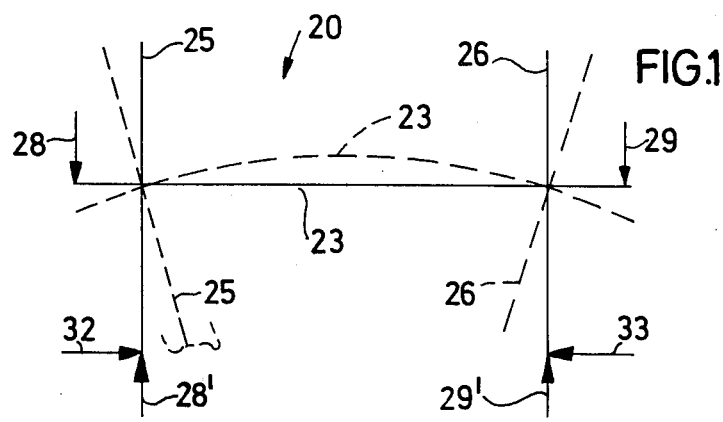
FIG.1
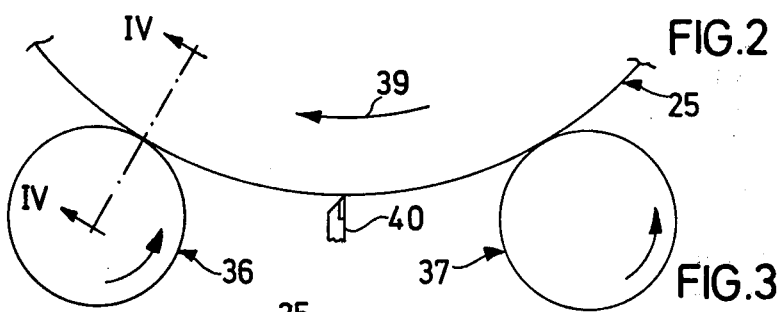
FIG.2
FIG.3
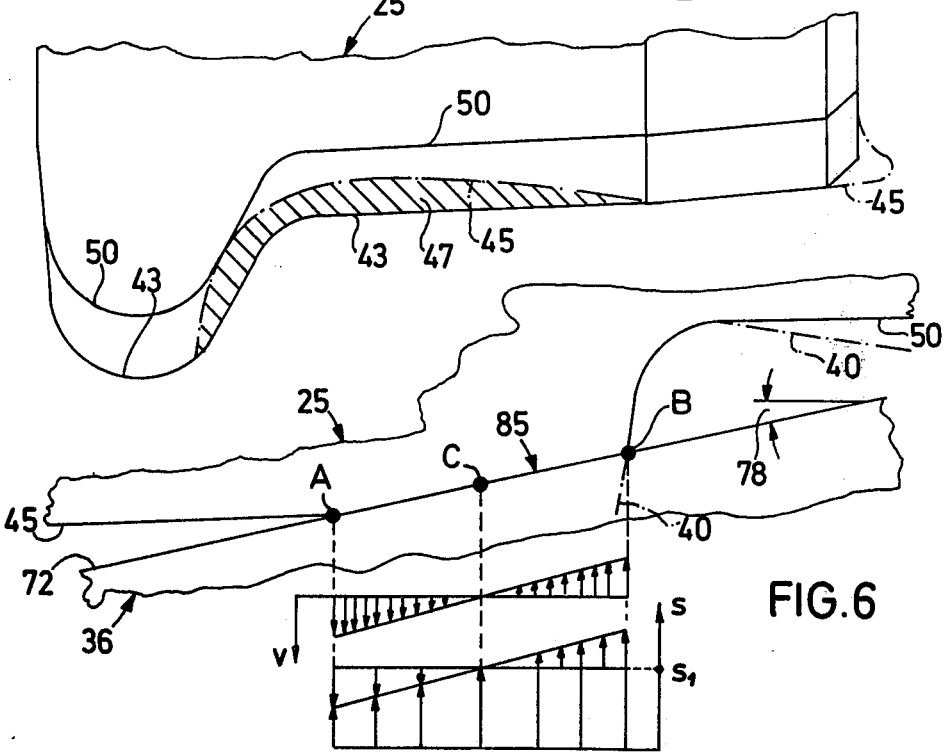
FIG.6

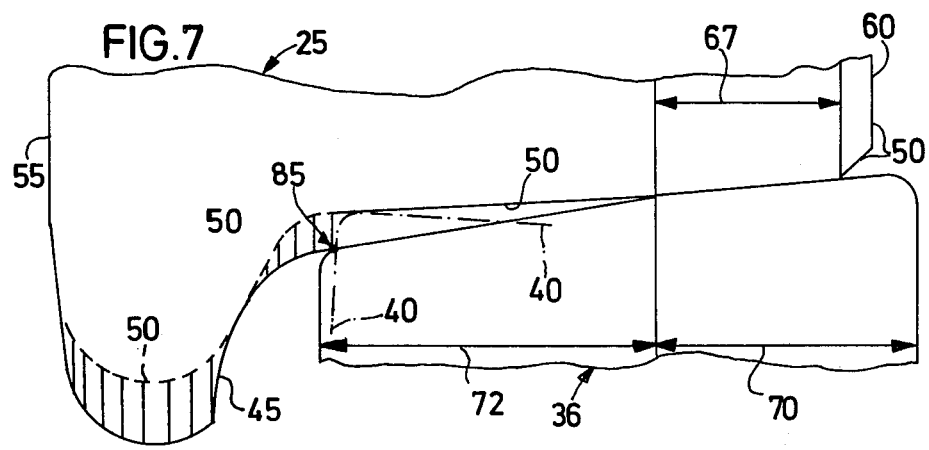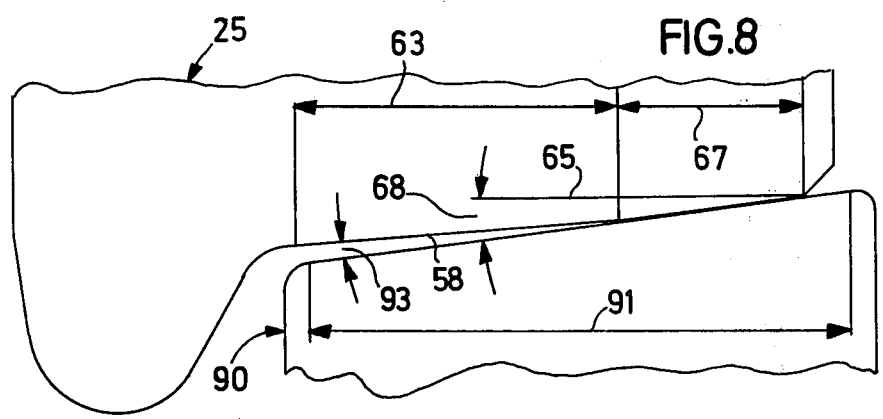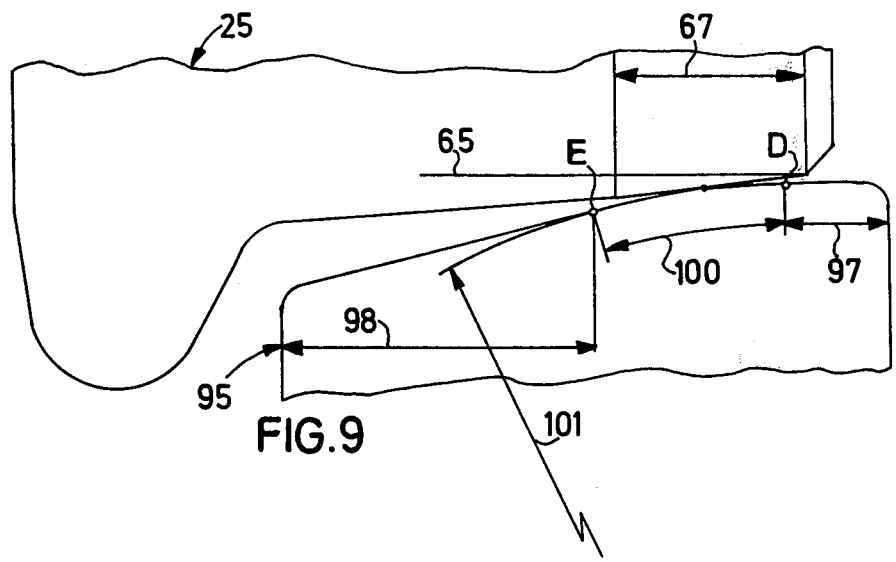

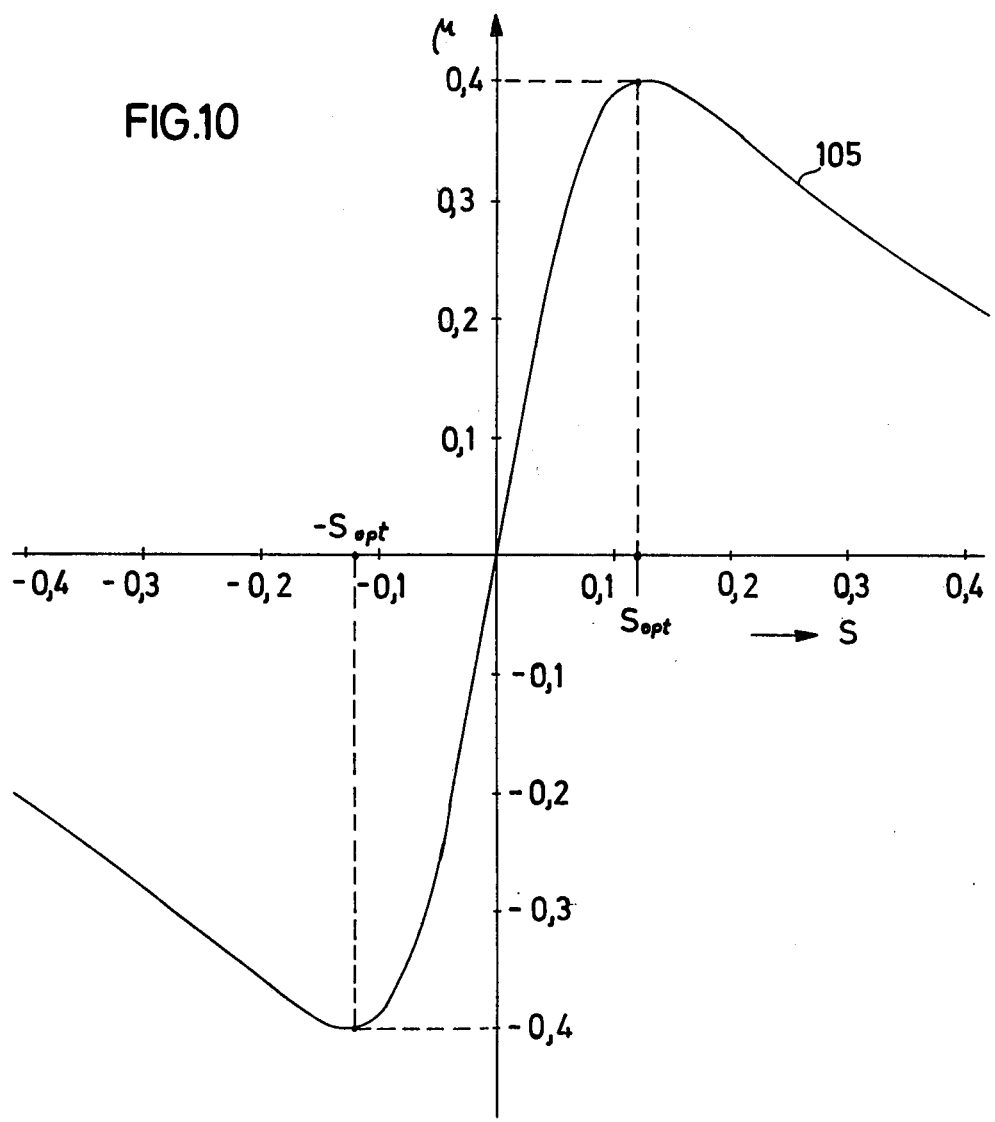

SUPPORT ROLLS FOR SUPPORTING WHEELS OF A WHEEL SET DURING REPROFILING

BACKGROUND OF THE INVENTION

The present invention relates to support rolls for underfloor turning machines for the remachining of worn wheel profiles of a wheel set in a continuous operation, in which each wheel of the wheel set is supported by two support rolls which are arranged spaced from each other substantially in a plane normal to the axis of the wheel set.

Such underfloor turning machines for wheel sets are known in the art and for instance disclosed in the German Pat. Nos. 1,043,020 and 1,082,478. In these known machines, each wheel of the wheel set is driven by two friction rolls engaging the tread surface of the respective wheel. The cutting operation during the reprofiling of the wheel profiles in these known machines has to be interrupted and the friction rolls have to be transposed as clearly explained in the German Pat. No. 1,082,478. This known method is therefore time consuming and difficult to carry out. Attempts have therefore been made to further develop such machines for reprofiling wheel sets in a continuous operation, that is without interrupting the cutting operation during reprofiling and while the wheel sets remain on the vehicle.

To obtain this desired result, an underfloor turning machine has already been disclosed in the DT-AS 1,477,697, in which each wheel of a wheel set is alternatingly supported by a tread surface roll pair and a rim surface roll pair. This known turning machine is however extremely complicated and the results obtained therefrom are far from perfect. The transfer from one to the other roll pairs cannot be carried out without undue shocks so that corresponding marks will be produced on the tread surface of the wheel. This known machine requires further additional friction drive rolls which engage the wheels at the end faces thereof. This entails not only a complicated construction, but has the additional disadvantage that the drive rolls are subjected to considerable friction and corresponding wear so that they will not stand up after extended use. Furthermore, the support carrying the turning tool has to be arranged in the last mentioned machine in a position as shown in FIG. 2 of the DT-AS 1,477,697. This arrangement of the turning tool has, however, proven disadvantageous. In order to obtain satisfactorily out of round of the wheels of the wheel set, the turning tool should be arranged between the two drive rolls. Such an arrangement is, however, impossible in the last-mentioned machine.

The journal "Revue Generale des Chemins de Fer", May 1960, pages 271–279 discloses and described further an underfloor turning machine in which each wheel of a railroad wheel set is driven by a pair of friction rolls. With this machine it is possible to turn the wheel profile in a continuous operation. Each drive roll (see page 276, FIG. 9) is relatively narrow and has an at least substantially cylindrical carrying zone and to opposite sides of the latter about 45° inclined discharge or transfer zones, through which a transfer from the not yet machined worn wheel profile to the new properly machined profile is made possible. In this known machine, each drive roll has, as viewed in axial direction of the wheel set the same position as would be taken by a rail during movement of the wheel set in longitudinal direction on a straight rail. In this known machine, the wheel set to be machined is positively supported by special means and the drive rolls are moved non-positively against the wheel set to turn the wheels. At the beginning of the machining operation, only the carrying zone of the drive roll profile is in contact with the worn profile of the wheel. The tool increasingly cuts the carrying zone clear until finally the cut edge of the wheel, resulting from the machining, will engage the transfer zone and move downwards along the same due to the continuing machining until the profiled portion, machined at the beginning, will engage the carrying zone. From this moment until the end of the machining operation, the wheel is in engagement only with the carrying zone.

In this construction the relatively great inclination of the transfer zone with respect to a horizontal plane is especially disadvantageous. Due to this inclination, there will result a considerable force component of the respective wheel set load portion directed toward the center plane of the machine and parallel to the wheel set axis, which acts on the effective radius of the wheel as lever arm, resulting in a bending of the wheel set shaft and corresponding inclined position of the wheels. The individual wheel will be thereby machined during the transfer period in an inclined position so that after resilient relaxation of the wheel set, at the end of the machining operation, a distorted tread profile will result. It is a further disadvantage that, during the change from the carrying zone to the greatly inclined transfer zone and the subsequent retransfer onto the carrying zone, a continuous change of the position of the wheel, due to the changing bend of the wheel set shaft, will result, which in turn will entail further defects in the desired machined profile.

From the journal "French Railway Techniques", No. 2, April-May-June 1961, and the article "New Development on the Re-profiling of Wheels without Dismounting Wheel Sets", Section IIIA, there is known a friction wheel pair, whereby the profile of each friction roll corresponds to the standard rail profile.

During transfer of tangential forces by friction there will necessarily result a slippage between the driven and the driving element. A predetermined slippage will therefore result from any predetermined tangential force. If the magnitude of the slippage surpasses or falls short of an optimum slip magnitude, the transferrable tangential force is reduced (see in this respect: "Der Kraftschluss zwischen Rad und Schiene" von Dr.-Ing. Arnold Tross, Munich, Glasers Annalen 93 (1969), Nr. 10 Oktober, S. 310–320, as well as "Wirkungsgrade der Vortriebstechniken spurgefuhrter Fahrzeuge" von Dr.-Ing. Ekkehard Gärtner (KDT), Hennigsdorf, DET-Die Eisenbahntechnik 23 (1975), Nr. 1, Seite 18 bis 20).

A slippage diagram is known from a great number of tests from the two last-mentioned publications, which in principle has an outline as illustrated in the corresponding slippage diagram in FIG. 10 of the present application. In this diagram the slippage S is shown on the abscissa and the friction coefficient $\mu$ is shown on the ordinate. The resulting curve shows a reversal point which indicates the highest possible transfer of a tangential force. This diagram shows clearly that an optional slippage of predetermined size will result in the highest obtainable transfer of tangential force. It the slippage surpasses or falls short of the optimal slippage, then the transferrable tangential force is reduced, that is, the two frictional engaging elements behave as if the initially provided friction coefficient μ would not be reached. The capability of the two elements which are in frictional rolling engagement with each other to transfer tangential forces is therefore continuously reduced with increasing deviation from the optimal slippage. The greatest tangential force can be transmitted between two bodies, in rolling engagement with each other and having parallel axes of rotation, when both bodies are of cylindrical form. With increasing conicity of the two rotational bodies which are in rolling engagement with each other, the maximum transferrable tangential force is increasingly reduced, under otherwise identical conditions.

Due to the relatively large inclination of the transfer zone of the friction drive roll of the below-the-floor turning machine described in the journal "Revue Generale des Chemins de Fer", the transferrable tangential force is therefore reduced. Due to the large inclination of the transfer zone, the respective wheel set load portion, that is the force at which the rollers are pressed against the wheels must therefore be held relatively small in order to reduce the forces acting parallel to the axis of the wheel set, which will bend the wheel set shaft, and which thereby will result in an inclined position of the wheels of the wheel set. Due to the reduced force with which the drive rolls are pressed against the wheels of the wheel set, only a transfer of relatively small tangential forces is possible, the size of which is, however, decisive for the machining efficiency and therewith for the output of such a machine.

SUMMARY OF THE INVENTION

It is an object of the present invention to provide an arrangement in turning machines of the aforementioned kind which avoids the above disadvantages inherent in such turning machines known in the art.

It is a further object of the present invention to avoid, during reprofiling of wheels in a continuous operation, any bending of the shaft of the wheel set with the corresponding inclined positioning of the wheels and the therefrom resulting distortion of the remachined wheel profile, while at the same time holding the means for supporting the wheels during the machining operation as simple as possible.

It is an additional object of the present invention to increase the machining efficiency over that of such turning machines known in the art, while assuring at the same time a smooth rotation of the wheel set during its machining.

With these and other objects in view, which will become apparent as the description proceeds, the present invention relates to rolls for supporting the wheels of a wheel set in a turning machine for machining worn wheel profiles in a continuous operation, in which each wheel of the set is supported by a pair of rolls which are arranged spaced from each other substantially in a plane normal to the axis of the wheel set and in which each roll has a peripheral surface having an axially extending carrying zone and an axially extending transfer zone, following the carrying zone in the direction toward a center plane of the set, and being inclined with respect to a horizontal line through an angle greater than the inclination of the desired profile to be machined into a portion of the wheel opposite the transfer zone, wherein the inclination of the transfer zone to a horizontal line is such that the radial distance between a point at an axial end of an active surface portion of the transfer zone facing the rim of the wheel and in a plane including the wheel set axis and the roller axis from the opposite point in said plane of the desired wheel profile is equal to the maximum depth of a cut produced by a turning tool during one revolution of the wheel.

The inclination of the transfer zone can, within the limits according to the present invention, be adapted in such a manner to the various operating conditions that the smallest possible axial loading of the wheel set and the maximum possible transfer of tangential forces between the support-and-driving roll and the wheel will result. The small inclinations are suitable for statically soft wheel sets having a small permissible tread surface wear and correspondingly a small depth of the cut at surfaces of a material of high strength, that is, for fast running wheel sets of passenger railroad cars or locomotives, or for profiles with small inclinations or a zero inclination with respect to a horizontal plane. On the other hand, large inclinations are permissible for statically stiff wheel sets such as wheels with relatively small diameters, for wheel sets of slow moving freight railroad cars, flat bed railroad cars, wheel sets with a high permissible profile wear and corresponding great depth of cuts produced during machining at relatively soft material of the tread surface.

In principle, the mentioned rolls may be drive and/or support rolls. The wheel set may be machined while it remains assembled with the coordinated vehicle or disassembled therefrom. The machining in a continuous operation is to be understood as machining the complete wheel profile without interruption by a tool engaging the wheel profile between the two rolls. The arrangement according to the present invention may be used in wheel sets in which the bearings for the wheel shaft are located outside or inside the wheels.

Typical values of the metal removal rate according to the present invention are a cutting speed of 40–60 meters per minute, an axial feed speed of 0.5 to 1.5 millimeters per revolution and a depth of cut of 7 millimeters.

One modification according to the present invention is characterized that the transfer zone extends in axial direction at least substantially up to a plane at right angles to the wheel set axis through the center of the fillet provided between the tread surface and the rim of the wheel. The axial length of the transfer zone is therefore limited, on the one hand, by the length of the carrying zone, which may be varied to a certain extent and, on the other hand, by the region of the aforementioned plane through the center point of the fillet. The end of the transfer zone at the wheel rim side can be located exactly in the aforementioned transverse plane or relatively shortly before or behind the same. The axial length of the wheel profile is thereby used to an optimal extent and therewith the inclination of the transfer zone with respect to a horizontal plane is reduced in a desirable manner. The inclination of the transfer zone is, as defined above, determined by the maximum depth of a cut which can be taken off during machining so that the carrying zone will be in contact with the machined profile of the wheel under all circumstances at the end of the transfer zone.

According to one form of the construction according to the present invention, the inclination of the transfer zone with respect to a horizontal line remains constant along the whole length of the transfer zone. The transfer zone is therefore of conical form. Such rolls can be manufactured in a relatively easy manner. Changes in the size of undesired axial forces due to a changing inclination of the transfer zone are thus avoided.

According to another form of construction according to the present invention, the carrying zone has, with respect to a horizontal line, an inclination which is equal to the inclination of the transfer zone with respect to the horizontal line. In this construction the total active surface of the roll is conical and the roll is therefore especially easy to manufacture.

According to a further modification of the invention, the tangent of the angle which the transfer zone includes with a horizontal line is equal or smaller than the coefficient of friction between the transfer zone and the wheel. In this case the arrangement is in the region of self-locking so that the above-mentioned undesirable axial forces will not be produced.

In accordance with a further modification of the invention, the peripheral surface of the transfer zone is provided with a profiling. This profiling will penetrate into the engaged wheel surface, which will result in a localized plastic deformation of the material of the wheel, which considerably increases the transmittable tangential force. The profiling can be in the form of a helical gearing. Thereby it is possible to reduce the axial forces directed toward the center plane of the turning machine and acting on the wheel set, or to obviate such axial forces completely.

In accordance with a further modification of the invention, the carrying zone and the transfer zone are joined by a spherical surface. This permits a very gentle transfer of the wheel from the carrying zone to the transfer zone. In addition such a roll can be used with wheels of different wheel profiles.

The axial extent of the active surface portion of the transfer zone is, according to another modification of the invention, about twice as large as the axial extent of the active surface portion of the carrying zone. In this way it is possible to maintain the inclination of the transfer zone with respect to a horizontal plane within desired narrow limits.

The carrying zone may be inclined with respect to the horizontal, in accordance with a modification of the present invention, in such a manner to correspond to the inclination of the desired profile of the opposite tread surface. This inclination can, for instance, be constant or even be zero.

In accordance with the present invention the axial extent of the carrying zone is further defined in that the carrying zone, starting from the center plane of the wheel set, is arranged beyond of a measuring circle plane, also called "taping line" of the wheel. This plane along which the diameter and the circumference of a railroad wheel is measured has been agreed upon by the industry and its distance from the inner wheel end face, or wheel back, is according to German industry norms 70 mm. This will result in a sufficient axial extent for the transfer zone so that the inclination of the latter may be held as small as possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic illustration of a wheel set with the forces acting thereon;

FIG. 2 is a schematic illustration of a wheel of a wheel set with two drive rolls;

FIG. 3 is a partial illustration of a wheel profile and indicating the original profile, the worn profile and the remachined profile.

FIG. 6 shows a detail VI of FIG. 5 at an enlarged scale;

FIG. 7 is an illustration similar to FIG. 5 and showing the wheel profile during further progress of the machining operation;

FIG. 8 illustrates the cooperation of a wheel profile with a drive roll of different configuration;

FIG. 9 is a view similar to FIG. 8 and showing a further modification of the drive roll; and FIG. 10 is a slippage diagram.

DESCRIPTION OF THE PREFERRED EMBODIMENTS

Figure 4:
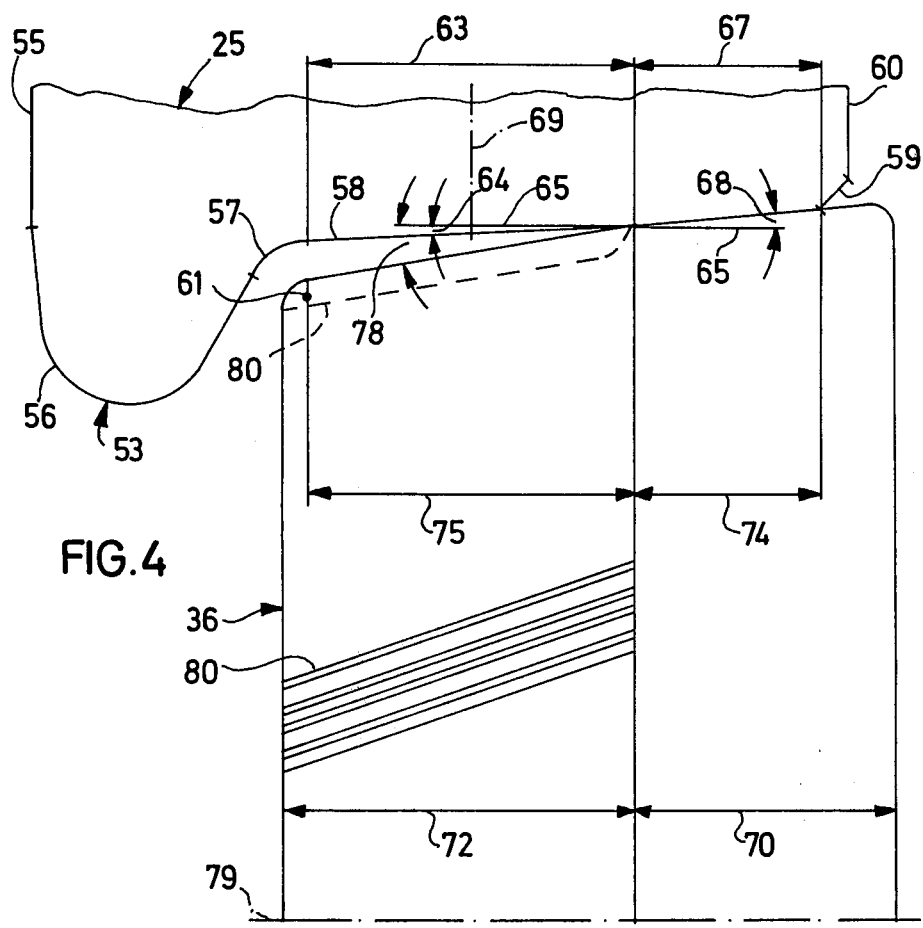
FIG. 4 is an enlarged cross section taken along the line IV—IV of FIG. 2.

FIG. 1 schematically illustrates a wheel set 20 having a shaft 23 and two wheels 25 and 26 fixedly connected to the shaft for rotation therewith. The forces acting on the wheel set 20 during reprofiling of the wheel profiles are only in part illustrated in FIG. 1. This figure shows only the vertical force components 28 and 29, as well as 28' and 29' and the horizontal force components 32 and 33 which will result in an elastic deformation of the wheel set 20 as shown in dotted lines in FIG. 1. FIG. 1 illustrates an arrangement in which the bearings for the wheel set are located axially outside of the wheels 25 and 26.

Whereas the vertical force components 28, 29 respectively 28' and 29', cannot be reduced without reducing of the machining efficiency, it is possible in accordance with the present invention to reduce the horizontal force components 32 and 33 which act on the wheels with a relatively large lever arm, that is, the radius of the wheels. The wheel radius is usually twice as large as the distance of the force components 28 and 28', respectively 29 and 29' from each other.

FIG. 2 schematically illustrates two drive and support rolls 36 and 37, which are spaced in a direction normal to the axes thereof from each other, and which support the wheel 25 and drive the latter in the direction of the arrow 39. The machining tool 40 is arranged midways between the rolls 36 and 37. The drive and control of the rolls 36 and 37 and that of the tool are known in the art and do not form part of the present invention.

One or both of the rolls 36 and 37 can serve only as support roll for the wheel 25. The turning of the wheel 25 is then produced either by one of the rolls 36 or 37 or by one or a plurality of additional drive rolls which may engage the front or the rear of the wheel 25, that is drive rolls having axes which are parallel to the drawing plane of FIG. 2.

FIG. 3 illustrates the original profile 43 of the wheel 25 in a full line and the worn profile 45 in a dash-dotted line. The hatched surface 47 between the original profile 43 and the worn profile 45 indicates therefore the wear of the wheel 25 which should be corrected by reprofiling of the same. The desired remachined profile 50 of the wheel is in FIG. 3 likewise indicated by a full line.

The profile 53 of the wheel 25 illustrated in FIG. 4 has the following successive zones: the wheel back 55, the wheel rim 56, the wheel rim fillet 57 with the center point 61, the tread surface 58, the chamfer 59 and the wheel front 60. The tread surface 58 is, in the section 63, inclined with a relatively small angle 64 relative to a horizontal line 65, whereas the outwardly adjoining section 67 has a greater angle 68 with respect to the horizontal line 65. A measuring circle plane, or taping line, 69 is indicated by a dash-dotted line in FIG. 4.

The drive roll 36 has a carrying zone 70 and a transfer zone 72 joining the carrying zone in direction toward the rim 56 of the wheel. The carrying zone 70 has an active surface portion 74 and the transfer zone 72 an active surface portion 75. The carrying zone 70 includes with a horizontal line 65 the same angle 68 as the tread surface portion 67. The angle 78, which the transfer zone 72 includes with the horizontal line 65, is however greater than the angle 64.

The drive roll 36 turns about an axis 79 which is parallel or at least in one plane with the axis of the shaft 23 of the wheel set. The surface of the transfer zone 72 is provided with a helical gearing 80 which, during a certain period of the machining of the wheel profile, will result in a deformation of the wheel profile section 63 and in an increase of the tangential force which can be transmitted from the roll 36 to the wheel 25.

FIG. 4 illustrates the condition at the end of the remachining operation.

Figure 5:
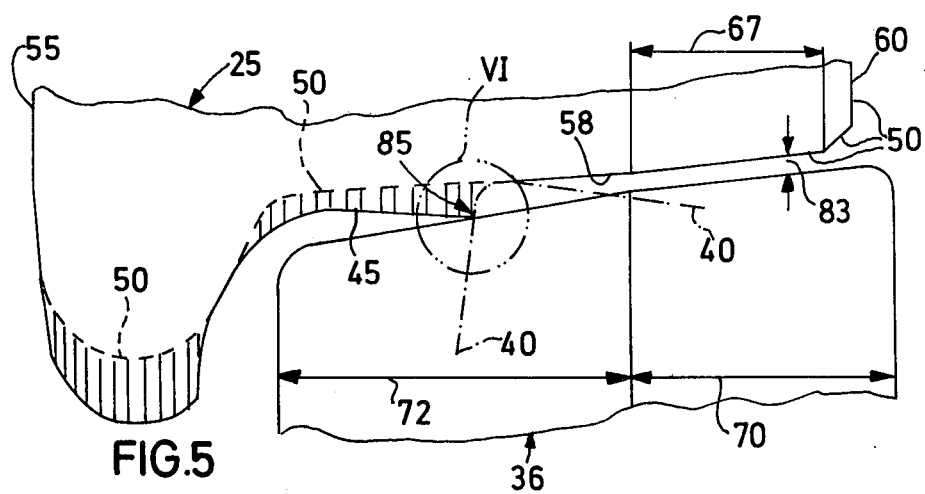
FIG. 5 is a view similar to FIG. 4 and illustrating the profile of the wheel during progress of the machining operation.

In the modification shown in FIG. 5, the transfer zone 72 is not provided with any gearing or different profiling.

At the moment of the remachining operation as illustrated in FIG. 5, the tool 40 has already machined a portion of the tread surface 58 and thereby produced a portion of the remachined new profile 50 so that the total carrying zone 70 is spaced through a radial distance 83 from the new remachined profile 50. An edge 85 of the worn profile 45 moves, corresponding to the advance of the tool 40, continuously downward along the transfer zone 72 until the radial distance 83 will be reduced to zero, as shown in FIG. 7, in which the wheel 25 engages, with the section 67 of its tread surface 58, the carrying zone 70 of the roll 36. At this moment, the edge 85 becomes disengaged from the transfer zone 72 and the tool 40 may finish the continuous reprofiling from the wheel front 60 to the wheel back 55.

The edge 85 cut into the wheel is in practice not a sharp edge, but, as shown in the enlarged FIG. 6, actually a contact surface of a width of for instance 10 millimeters. The axial end points A and B of the edge or contact surface 85 are located on the inclined transfer zone 72 and have therefore the same angular speeds, but circumferential speeds of different size. Starting from the circumferential speed of a point C, located midway between the points A and B, the function of the circumferential speed $v$, relative to the circumferential speed in the point C is indicated in FIG. 6. As can be seen, the circumferential speeds at the various points with the exception of the point C will change in direct proportion to the size of the angle 78, when the wheel axis and the roll axis 79 are located in the same plane and parallel to each other. These differences in the circumferential speeds will result in a more or less large superimposed slippage S between the edge 85 and the transfer zone 72. This slippage will be discussed later on further in connection with FIG. 10. In FIG. 6 $S_1$ is the slippage that would occur between two cylindrical bodies having diameters corresponding to the diameters of the wheel 25 and the drive roll 36 in a plane passing through point C.

FIG. 8 illustrates a modification in which a drive roll 90 includes, along its complete active surface 91, an angle 68, which corresponds to the angle which the section 67 of the tread surface of the wheel 25 includes with a horizontal line 65. In this modification, there remains between the active surface portion 91 of the roll 90 and the section 63 of the tread surface 58 a relatively small angle 93 which, however, is sufficient if the cutting tool takes a cut of relatively small depth.

In a further modification shown in FIG. 9, a drive roll 95 has a short carrying zone 97 and a transfer zone 98 connected to the carrying zone 97 by a spherical surface 100 located between the points D and E. The radius 101 of the spherical surface portion 100 is about equal to the radius of the roll 95 at this transition place. This modification is adapted for use with wheels in which the tread surface section 67 includes different angles with a horizontal line, varying from 0° to an angle corresponding to the angle which the transfer zone 98 includes with the horizontal line 65.

FIG. 10 illustrates a slippage diagram applicable for two cylindrical steel bodies with parallel axis of rotation which are in rolling and driving engagement with each other. In this diagram the slippage S is indicated on the abscissa and the apparent resulting friction coefficient $\mu$ on the ordinate and indicating the relationship of the actually occurring circumferential force to the constant wheel load. The slippage S is defined as:

$$S = 1 - \frac{v}{r \cdot \omega}$$

In this formula $v$ is the translatory speed of a wheel set rolling on a rail, $r$ is the radius of the driving steel body, and $\omega$ is the angular speed of the driving steel body.

In the present case in which two cylindrical bodies roll upon each other, $v$ has to be replaced by $v = r_1 \cdot \omega_1$, wherein $r_1$ is the radius of the driven steel body (the wheel), and $\omega_1$ is the angular speed of the driven steel body. As shown in FIG. 10, the slippage curve 105 has its maxima to both sides of the zero point of the diagram at a slippage S of about ±0.12. If these slippage values are obtained, then the greatest friction coefficient of 0.4 between the drive roll and the driven wheel are used for transmission of a tangential force between these two elements. The negative portion of the slippage diagram is the logical consequence from the reversal of the direction of the slippage. This negative portion of the diagram gives information about the loss of efficiency due to occurrence of a superimposed slippage as indicated in FIG. 6. The greater the angle 78 in FIG. 6 is, the greater will be the differences between the speeds at the end points A and B of the edge 85 and the greater will then be also the superimposed slippage. This means that at each point between the points A and B, there will be different speeds $v$. Assuming that at the point C the optimal slippage S opt of 0.12 prevails, then it is evident that the slippage decreases from the point C in the direction toward the point A and increases in the direction toward the point B. If the angle 78 is sufficiently great, then a negative slippage will occur at the point A, that is, the resulting slippage will there provide a breaking action. On the other hand, the slippage in the point B clearly surpasses the value 0.12 and in the region of the point B, the usable friction coefficient is, therefore, considerably smaller than the optimal friction coefficient. Therefore, the friction coefficient will decrease with increase of the slippage and correspondingly the tangential force transmitted by the drive roller onto the wheel will decrease. A relatively small angle 78, (FIG. 6) will therefore be advantageous for the transmission of the tangential force between the drive roller and the wheel. Such a relative small angle 78 has also the advantage that the horizontal force component occurring at the cut edge 85 will be relatively small and, when the tangent of the angle 78 is smaller than the usable friction coefficient, will have no effect at all on the wheel set (self-locking).

It will be understood that each of the elements described above, or two or more together, may also find a useful application in other types of rolls for supporting wheels for the wheel set during reprofiling differing from the types described above.

While the invention has been illustrated and described as embodied in rolls for supporting wheels for the wheel set during reprofiling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. In an underfloor turning machine for remachining worn wheel profiles of a wheel set in a continuous operation, in which each wheel has a wheel rim at an inner end thereof, a combination comprising a pair of rolls for supporting each wheel of said set, the rolls of each pair of rolls being arranged spaced from each other substantially in a plane normal to the axis of the wheel set; and a turning tool for machining the profile of each wheel arranged between the rolls of each pair of rolls, each roll having a peripheral surface provided with an axially extending carrying zone and an axially extending transfer zone following the carrying zone in a direction toward a center plane of the wheel set and being inclined with respect to a horizontal line through an angle greater than the inclination of the desired profile to be machined into a portion of the wheel opposite said transfer zone, wherein the angle included between the transfer zone and a horizontal line is such that the radial distance between a point at an axial end of an active surface portion of the transfer zone facing the rim of the wheel in a plane including the wheel set axis and the roll axis from the opposite point of the desired wheel profile in said plane is equal to the maximum depth of a cut produced by the turning tool during one revolution of the wheel.

2. A combination as defined in claim 1, wherein each wheel has a fillet between its rim and the remainder of its peripheral surface, and wherein the active surface portion of the transfer zone of each roll extends in axial direction substantially up to a plane normal to the axis of the wheel set and passing through the center point of said fillet.

3. A combination as defined in claim 1, wherein the inclination of the active surface portion of the transfer zone with respect to a horizontal line is constant along the whole length of said portion.

4. A combination as defined in claim 3, wherein the inclination of the carrying zone with respect to a horizontal line is equal to that of the transfer zone.

5. A combination as defined in claim 1, wherein the tangent of the angle of inclination of the transfer zone with respect to a horizontal line is at most equal to the coefficient of friction between the transfer zone and the wheel.

6. A combination as defined in claim 1, wherein the surface of the transfer zone is profiled.

7. A combination as defined in claim 6, wherein the surface of the transfer zone is provided with a helical gearing.

8. A combination as defined in claim 1, wherein a part spherical surface is located between the carrying zone and the transfer zone.

9. A combination as defined in claim 1, wherein each of said zones has an active surface portion and wherein the axial extension of the active surface portion of said transfer zone has a length which is about twice the axial extension of the active portion of said carrying zone.

10. A combination as defined in claim 1, wherein the inclination of the carrying zone with respect to a horizontal line corresponds to that of the desired profile of the tread surface of the wheel opposite the carrying zone.

11. A combination as defined in claim 1, wherein said carrying zone is spaced from the center plane of the wheel set a distance greater than the distance of a measuring circle plane or a taping line of the wheel from said center plane.

* * * * *